Nov. 28, 1961     S. CASANOVA ESTEVE     3,010,869
METHOD OF AND APPARATUS FOR THE INJECTION MOLDING OF ARTICLES
Filed Aug. 30, 1957
FIG 1
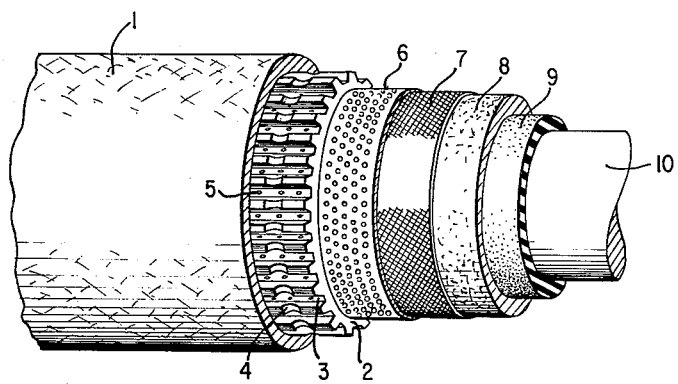
FIG 2
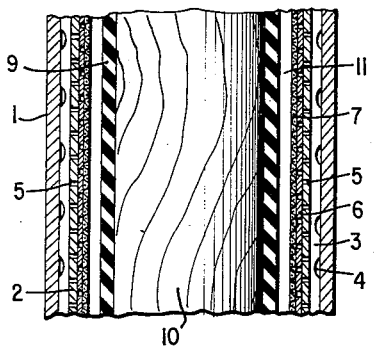
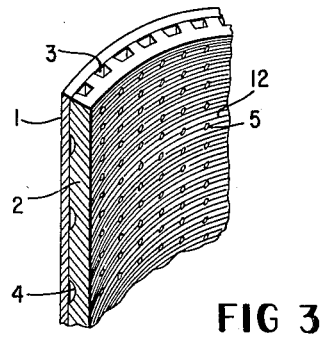
FIG 3
FIG 4
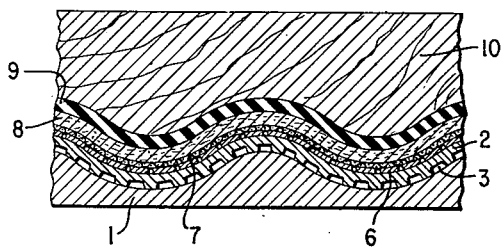
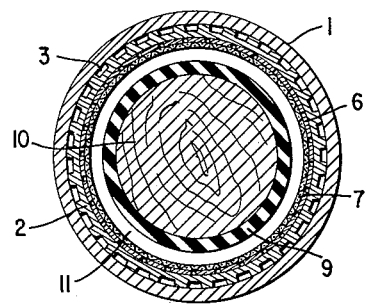
FIG 6
FIG 5
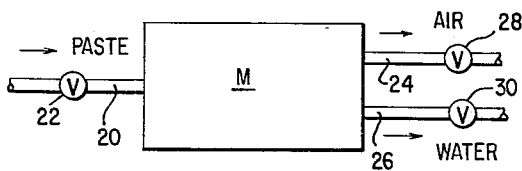
INVENTOR.
SEBASTIAN CASANOVA ESTEVE
BY
ATTORNEY

United States Patent Office 3,010,869
Patented Nov. 28, 1961

3,010,869
METHOD OF AND APPARATUS FOR THE INJECTION MOLDING OF ARTICLES
Sebastian Casanova Esteve, 3 Maria de Molina,
Valencia, Spain
Filed Aug. 30, 1957, Ser. No. 681,416
Claims priority, application Spain Dec. 17, 1956
7 Claims. (Cl. 162—227)

This invention relates generally to the molding art, and more particularly to a method of and apparatus for the injection molding of articles, especially those which are annular in cross section.

In the past when various types of articles have been injection molded, it was found that with certain configuration molds, such as those which are annular, the molding medium did not sufficiently fill the molding chamber. This was caused by several factors, one of the most important of which is the drag or friction between the advancing molding medium and the walls of the mold.

In those processes now in use, the molding medium or material does not constantly, completely and uniformly fill all of the spaces of the mold and this is to a large extent caused by the loss of fluidity or loss of moisture from the moisturized molding medium, since this moisture is withdrawn from the medium as it advances in the mold. As the advance of the molding medium progresses in the mold, more of the moisture is withdrawn therefrom and proper penetration of the molding chamber becomes increasingly difficult and at times becomes an unsurmountable obstacle, thus causing an insufficient filling of the molding chamber which produces nonuniform articles.

On the other hand, an attempt to retain water by making the wall of the molding chamber completely impermeable is not practical since, in such an event, there will be within the mold an excess of moisture which has been removed from the medium. This will interfere with the proper penetration of the medium into the mold and accordingly will hamper the molding operation.

With these defects of the prior art in mind, it is an object of this invention to provide a method of pressure injecting articles using a moisturized molding medium, and which is capable of molding articles into any desired shape.

Another object of this invention is to provide a method of and apparatus for molding articles of a moisturized molding medium in a simple and easy manner which is inexpensive and readily permits penetration of the molding medium into all the interior parts of the mold, even those which previously in the art have been very difficult to fully penetrate.

Another object of this invention is to provide a method of and apparatus for molding wherein the molding medium will completely fill all of the spaces of the molding chamber, and advance evenly along the mold until it fills all of the spaces.

These objects and others ancillary hereto are accomplished according to preferred embodiments of the invention. During the molding process, the pressure is kept constant, or at least above a predetermined minimum value, so that the molding medium is constant throughout in density and thickness. The moisture during this time is used to lubricate the walls of the mold in advance of the medium penetrating the chamber. Then, the mold is made water permeable so that the moisture and water within the mold may be withdrawn as desired.

The structure for accomplishing such a method includes a molding chamber which is closed and the wall of which is provided with a plurality of intercommunicating channels therein which communicate with each other and with the molding chamber. Thus, water which is expelled from the mass advancing into the mold may flow through these channels and along the surface of the mold. Also provided are valves or other devices for maintaining the air within the mold at the proper pressure so as to regulate the advance of the mass of material at a uniform and proper velocity by allowing the air to be released at a speed equal to or less than that at which the mass of material advances, in order to maintain a preselected minimum pressure within the molding chamber.

The valves provided are operated so that after the molding medium has penetrated the molding chamber, the expelled moisture may be removed from the intercommunicating channels, and means may be provided for squeezing or compressing the molding medium so as to expell further moisture therefrom. Such means may be pneumatic compression or other mechanical means which must be sufficient to expel from the molding medium water which may be discharged therefrom by operation of the valves. During the injection molding process, a portion of the moisture within the molding medium paste or plastic which is expelled is retained along the mold surfaces so as to form a lubricating lining thereon which bathes and lubricates these surfaces to counteract any friction between the paste and the mold surface.

The mold surface includes a double wall which defines longitudinal and transverse channels therebetween which intercommunicate at their intersections. A plurality of openings are provided through one of the walls to communicate these channels with the interior of the mold. A sieve is disposed along the interior mold surface which may be provided with grooves, and this mold surface structure serves to retain moisture therein during the molding operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a fragmentary perspective view with the respective layers being consecutively broken away for purposes of clarity, illustrating the construction of a mold for constructing tubes or other annular articles;

FIG. 2 is a sectional view taken diametrically through the mold of FIG. 1;

FIG. 3 is a fragmentary perspective view illustrating the double wall of the mold;

FIG. 4 is a sectional view of another embodiment of the invention wherein corrugated plates and the like may be molded;

FIG. 5 is a transverse sectional view of the mold illustrated in FIGS. 1 and 2, and FIG. 6 is a schematic drawing of the mold, and some associated valves.

With more particular reference to the drawings, an outer mold wall or surface 1 is provided which defines the outer limits of the mold proper. An internal wall 2 underlies this outer wall 1, both of which are tubular, and is provided with a large number of grooves 12 on the interior surface thereof. Spaced, longitudinally extending channels 3 are formed in the outer surface of the interior wall 2, and are closed by the inner surface of outer wall 1. Wall 1 also closes the transverse channels 4 which are spaced from each other, but intersect and intercommunicate with the longitudinally extending channels 3. A large number of openings 5 are formed through the inner surface of the inner wall 2, and communicate the channels 3 and 4 and the interior of the molding chamber.

A sieve or foraminous plate 6 engages the interior surface of the inner wall 2 and a sieve or filter 7 is in close engagement with sieve 6. A mass of material which has been molded is indicated at 8, and is shown in FIG. 1 as being disposed in the molding chamber. The mold is provided with a central core including a relatively rigid member 10 which may be constructed of wood or the like, together with a rubber tube 9 encircling rigid member 10 so that the molding chamber is annular to form a tube.

As shown more clearly in FIG. 6, the mold M is provided with an inlet conduit 20 for injecting the paste or other molding medium into the mold, and having a valve 22. At the other end of the mold, two conduits 24 and 26 are provided for the release of air and water, respectively. These conduits are provided with valves 28 and 30 for selectively controlling the release of air and water from the interior of the molding chamber. The conduit for the release of air communicates with the space 11 between the rubber tube 9 and the interior molding surface 7 so that the trapped air within the mold may be released at any desired rate. The conduit for water 26 is in communication with the mold wall structure which retains the water expelled from the molding medium. These valves may be provided in any desired position or relationship with the conduits and the mold without departing from the spirit of the invention, and all such modifications are considered as being within the purview of this invention.

Other structure, not shown in the drawings, but which will be necessary for the molding operation, are shutters, inlets and openings for providing pressurized air to be disposed within the tube 9 for the final compacting or extracting of moisture from the tube after the injection molding per se has been completed, as well as other secondary elements all of which are relatively well known in the molding art.

In order to present the invention more clearly, the molding process will now be described. The molding material which may be fibrocement or any other desired molding material is introduced into the molding chamber defined by space 11 under pressure through conduit 20 which is constructed with the proper nozzle and valve arrangement, as is well known in the art of pressure molding. Once the molding medium begins penetration into the mold, it continues until the entire molding chamber is filled with the molding medium. During this time, the pressure upon the molding medium expels some of the moisture from within the medium and this flows through filter 7, sieve 6, openings 5, and through and along the channels 3 and 4 so that the internal wall 2 is constantly wet.

The moisture lies on the surface of and in the interstices of filter 7, and lubricates the advancing molding medium. This moisture also assures that the molding medium will not become unduly dry during its penetration of the mold. Thus, the molding medium maintains the proper degree of softness, and the moisture lubricates and reduces the friction between the molding medium and the filter 7.

During the molding process, the valves allowing release of internal fluid, such as valves 28 and 30, will be closed until the internal pressure of the mold attains a predetermined minimum value. At this time, the valve 28 may be opened to release air or other fluid gas within the mold at a speed which is not greater than that of the molding medium advancing into the mold, so that the predetermined desired minimum pressure will always be maintained.

When this stage of the molding operation has been carried out, air is provided under pressure between the tube 9 and the rigid core 10 to compress the mass of molded material 8 against the filter 7 through which the moisture which is extracted will flow. This moisture flows through the interstices of sieve 6, openings 5, and through and along channels 3 and 4. Then, the valve 30 for discharging the water may be opened. This valve is associated with conduit 26 connected with channels 3 and 4 so that the moisture may be removed from the mold as desired. As much moisture as possible is extracted from the molded article 8 and removed through conduit 26 so that the article will set somewhat, and in this manner, will retain its desired shape so it may then be removed as desired from the mold.

In order to properly align the fibers or loose portions of the molding material if a fibrocement or the like is used, rotating motion may be given to one of the component parts of the mold to provide the proper alignment and filling. The mold construction as herein presented may be changed somewhat according to the exigencies of the situation. For example, the mold must, of course, be changed in order to conform to the shape of the article to be molded. Also, the materials from which the articles are to be formed may be varied. The number and diameter of the water conducting openings may also be changed as well as the direction and number of the channels, the type of valves to be used, and some other features of the mold construction.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A method for injection molding a fibrillar plastic in paste form comprising the steps of: introducing a mass of the paste of indeterminate shape into a mold under pressure, retaining a portion of the moisture in said paste about the interior surfaces of the mold to act as a lining therefor, and compelling said mass to advance into said mold while being lubricated by the retained moisture and while under pressure.

2. The method of claim 1 wherein the pressure within said mold is at least maintained equal to a preselected value, discharging the air in the mold at a velocity not more than that of the entering paste so that the pressure is prevented from dropping below the preselected value.

3. A mold for the injection molding of a fibrillar plastic in paste form comprising a body having a wall defining a molding chamber, said wall having a plurality of manifolds formed through the entire interior surface thereof which communicate with each other by passages and with the molding chamber by openings both formed in the interior surface to retain moisture from the paste introduced into the chamber, a plurality of grooves formed in said interior surface, means for regulating the escape of air from the chamber during injection of the paste into the mold so that a preselected internal pressure may be maintained, and means on said body for extracting the moisture from the paste.

4. A mold for the injection molding of a fibrillar plastic in paste form comprising a body having an internal molding chamber therein and including a pair of concentric contacting walls disposed in said chamber, said walls defining longitudinal and transverse channels therebetween which communicate with each other at points of intersection and which communicate with said chamber by openings formed through the innermost of said walls, grooves formed in the interior surface of the innermost wall a sieve engaging the interior surface of the innermost wall to act as a mold wall for the paste, which together with said channels define a plurality of compartments which take up and retain moisture from the paste in the mold to form a moisture lining which bathes the sliding surface of the advancing paste.

5. A tube mold for the injection molding of fibrillar plastic comprising a body having inner and outer mold surfaces to define a molding chamber, said outer mold surface including a double wall defining longitudinal and transverse channels therebetween in communication with each other at their points of intersection, and a plurality of openings formed through one of said walls to communicate said channels with said chamber, a sieve lining the outer mold surface so that together with said channels a water retaining structure is defined to take up and retain moisture from the plastic in the mold to form an aqueous lining which bathes the mold surface, said inner mold surface including an inflatable core to dehydrate the plastic with the mold upon inflation thereof.

6. A method for molding a moistened paste in plastic state comprising the steps of: introducing a mass of such paste of indeterminate shape into a mold under pressure, retarding penetration of the body of the mass into the mold at a controlled rate sufficient to maintain pressure on the mass to expel moisture therefrom to lubricate the surface of the mold while allowing the mass to advance into the mold, and maintaining pressure on the mass sufficient to overcome the rate of retarding pressure to advance the mass in the mold while this expelled moisture lubricates the interior surfaces of the mold.

7. A mold into which a moistened molding medium is introduced under pressure, comprising a closed body defining a closed molding chamber, means for introducing a molding medium under pressure into said chamber, means for selectively controlling the rate of release of trapped air and thus the amount of pressure in said chamber whereby the introduction of molding medium into the chamber may be retarded sufficiently to expel moisture from the medium while permitting it to advance along the mold, the entire outer wall of the molding chamber including a moisture retaining covering to retain moisture expelled from the molding medium and bathe the molding chamber wall in advance of the molding medium penetrating the chamber to lubricate the outer wall of the molding chamber.

References Cited in the file of this patent
UNITED STATES PATENTS

| | | |
|---|---|---|
| 1,272,566 | Sutherland | July 16, 1918 |
| 1,552,064 | Lake | Sept. 1, 1925 |
| 2,124,745 | Morgan | July 26, 1938 |
| 2,723,600 | Kyle | Nov. 15, 1955 |
| 2,734,430 | Kletzien | Feb. 14, 1956 |
| 2,802,404 | Taylor | Aug. 13, 1957 |
| 2,841,054 | Mueller | July 1, 1958 |